(12) United States Patent
Gordon et al.

(10) Patent No.: US 6,174,987 B1
(45) Date of Patent: Jan. 16, 2001

(54) POLYCARBONATES DERIVED FROM SPIROBIINDANOLS AND DIHYDROXYAROMATIC COMPOUNDS

(75) Inventors: Janet L. Gordon, Clifton Park; Kevin R. Stewart, Schenectady, both of NY (US)

(73) Assignee: Molecular OptoElectronics Corporation, Watervliet, NY (US)

( * ) Notice: Under 35 U.S.C. 154(b), the term of this patent shall be extended for 0 days.

(21) Appl. No.: 08/920,931

(22) Filed: Aug. 29, 1997

Related U.S. Application Data

(63) Continuation of application No. 08/799,798, filed on Feb. 13, 1997, now abandoned.

(51) Int. Cl.[7] ................................................. C08G 64/00
(52) U.S. Cl. ........................................ 528/198; 528/196
(58) Field of Search ................................ 528/196, 198

(56) References Cited

U.S. PATENT DOCUMENTS

| | | | |
|---|---|---|---|
| 4,895,919 | 1/1990 | Faler et al. | 528/26 |
| 4,950,731 | 8/1990 | Faler et al. | 528/201 |
| 5,424,389 | 6/1995 | Wimberger Fried et al. | 528/201 |

OTHER PUBLICATIONS

K.C. Stueben, "Polymers Containing the 3,3,3',3'–Tetramethyl–1,1'–Spirobiindane Residue", Journal of Polymer Science: Part A, 3, 3209–3217 (1965).

*Primary Examiner*—Terressa M. Boykin
(74) *Attorney, Agent, or Firm*—Heslin & Rothenberg, P.C.; Martha L. Boden, Esq.

(57) ABSTRACT

Linear polycarbonate polymers are disclosed which contain spirobiindanol derivatives regularly alternating in the polymeric chain with derivatives of dihydroxyaromatic compounds, such as biphenols and bisphenols. These clear spirobiindane-dihydroxyaromatic polycarbonates exhibit high glass transition temperatures and exhibit good mechanical and optical properties. In addition, the alternating polycarbonates are thermally stable and remain ductile even at temperatures greater than 150° C. The polycarbonates are therefore useful in high temperature processing and optical applications. The disclosed polycarbonates exhibit indices of refraction that differ sufficiently from those of randomly distributed SBI/BPA polycarbonates to make them useful in the manufacture of optical waveguides.

10 Claims, No Drawings

POLYCARBONATES DERIVED FROM SPIROBIINDANOLS AND DIHYDROXYAROMATIC COMPOUNDS

This application is a continuation, of application Ser. No. 08/799,798, filed Feb. 13, 1997, now abandoned.

The following invention was made with Government support under contract number F33615-95-C-5432 awarded by the United States Air Force. The Government has certain rights in this invention.

FIELD OF THE INVENTION

The present invention relates to linear polycarbonate polymers comprising alternating blocks of spirobiindanol and dihydroxyaromatic compound derivatives. In particular, this invention relates to high molecular weight polycarbonates that are clear and ductile.

BACKGROUND OF THE INVENTION

Polycarbonates are well-known as excellent materials for optical applications because of their inherent toughness and clarity. The most familiar linear polycarbonates are homopolymers derived from 2,2-bis(4-hydroxyphenyl)propane, commonly known as bisphenol-A (hereinafter, BPA) and illustrated by the following structure:

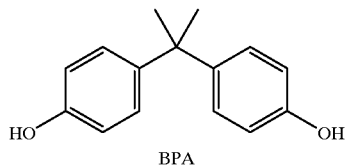

BPA

BPA-based homopolymeric materials are transparent and exhibit excellent mechanical properties. Thus, they are often used in the fabrication of optical materials such as lenses and substrates for optical storage media.

During manufacturing, the polymeric polycarbonate is typically molded at high temperatures and pressures which, upon cooling, may lead to molecular orientations and stresses that are frozen into the material. In such cases, the cooled polycarbonate becomes anisotropic and exhibits orientational birefringence. As a light ray passes through a birefringent material, it is split into two plane-polarized light rays, each having a plane of polarization extending in a perpendicular direction relative to the other. Each light ray has a different index of refraction in the polymer, and the difference between these indices of refraction is referred to as the birefringence of the material. Because light passing through a birefringent material may follow more than one path, distortion of the light may result. Thus, birefringence is an undesirable property for polymers used in optical applications. Ideally, materials used in optical applications should have a birefringence substantially equal to zero.

Wimberger Friedl et al. reported in U.S. Pat. No. 5,424,389 and European Patent Application 0621297A2 random copolycarbonates of BPA and 6,6'-dihydroxy-3,3,3',3'-tetramethyl-1,1'-spirobiindane (hereinafter SBI). SBI is represented by the following structure:

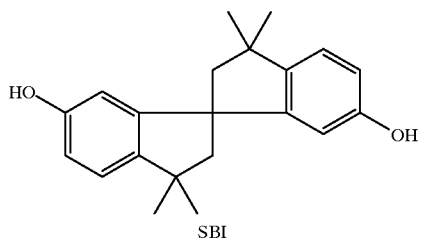

SBI

Wimberger Friedl et al. found that when the mole fraction of SBI in the random SBI/BPA copolycarbonate varies from 0.844 to 0.887, there are dramatic improvements in birefringence over BPA polycarbonate homopolymers, as measured by the stress-optical coefficient ($C_m$). The stress-optical coefficient ($C_m$) for a polymer is a measure of its sensitivity to orientational birefringence. Preferably, the absolute value of $C_m$ in polymers used in optical applications is substantially equal to zero. Similarly, Faler et al. disclosed in U.S. Pat. No. 4,950,731 that random SBI/BPA copolymers demonstrate improved optical properties as compared with BPA polycarbonates.

In addition, high glass transition temperature values ($T_g$) are critical for molded polycarbonate resins that undergo high temperature processing (>1500° C.) to maintain the integrity of the molded part. Such high temperature processing occurs, for example, during the application of chemically resistant hard coats or thick surface coatings often used in optical applications and during the vapor deposition of coatings which have specific optical device utilities.

SBI homopolycarbonates exhibit a high $T_g$ (up to 230° C.), as disclosed in the aforementioned patent to Faler et al., but the mechanical strength and ductility of SBI materials are much reduced relative to the BPA polycarbonates. By contrast, commercially available polycarbonate resins based solely on BPA exhibit excellent optical and mechanical properties, but they are unsuitable for high temperature applications or further high temperature surface processing because of their relatively low glass transition temperature values of approximately 150° C.

However, by adding and varying the amount of BPA monomer in spirobiindane (SBI) based polycarbonates, Faler et al. reported that the low $T_g$ of BPA polycarbonates can be counteracted. These SBI and BPA monomers used in combination produce random copolymers with a high $T_g$ between 164 and 218° C. Random SBI/BPA copolymers or copolycarbonates, as used herein, refer to polymers in which SBI and BPA monomers are randomly distributed in the polymeric backbone chain. Thus, in random polymers, the arrangement of the monomers which comprise the backbone composition cannot be controlled.

An optical waveguide or optical fiber, useful in the field of optical information transmission, typically comprises an outer cladding material having a central channel that is filled with a light-transmitting core material exhibiting a higher index of refraction. To promote internal reflection, the light transmitting core material must have an index of refraction that is higher than that of the cladding material by at least 0.3%. Because of the desirable optical and thermal properties described above, copolymers of SBI and BPA are potentially useful in the fabrication of waveguides. As used herein, index of refraction and refractive index are interchangeable.

The present invention is based on the unexpected discovery of high molecular weight linear polycarbonates derived from various spirobiindane bisphenol and dihydroxyaromatic derivatives that can be used in combination with random SBI/BPA polycarbonates to create optical waveguides and optical fibers. In particular, the indices of refraction of the present polymers differ by at least 0.3% from those of known SBI/BPA random polycarbonates. Thus, the polymers of the present invention can be used as either core or cladding materials in optical fibers employing random SBI/BPA polycarbonates as respective cladding or core.

The novel polycarbonate polymers of the present invention, as shown in the following structure (I), comprise alternating blocks or units of the aforementioned derivatives. The composition of the polymeric backbone is uniform and exactly controlled. In addition, the present polycarbonates are clear and ductile exhibiting high glass transition temperatures and excellent optical properties.

SUMMARY OF THE INVENTION

Accordingly, the polymers of this invention are linear polycarbonate polymers comprising structural units of the formula spirobiindane randomly distributed with monomers of 2,2-bis(4-hydroxyphenyl)propane. The mole percentages of SBI and BPA in the random polycarbonate may be equal, wherein the mole percentage of both SBI and BPA is 50 mole percent.

In another aspect, the linear polycarbonate polymers of the present invention comprise alternating units or monomers of a spirobiindanol derivative and of a dihydroxyaromatic compound derivative. The alternating polymer has a glass transition temperature value of at least 151° C. In another aspect, the alternating spirobiindanol and dihydroxyaromatic compound units result in a refractive index that differs by at least 0.3% from those of SBI/BPA based random copolycarbonates.

The novel linear polycarbonate polymers of the present invention, in which derivatives of spirobiindanols and dihydroxyaromatic compounds regularly alternate, exhibit improved thermal and optical properties and higher $T_g$ values (>150° C.) as compared with commercially available polycarbonate resins based solely on BPA. Thus, the present polycarbonates are able to withstand higher temperature processing. In addition, these high molecular weight poly-

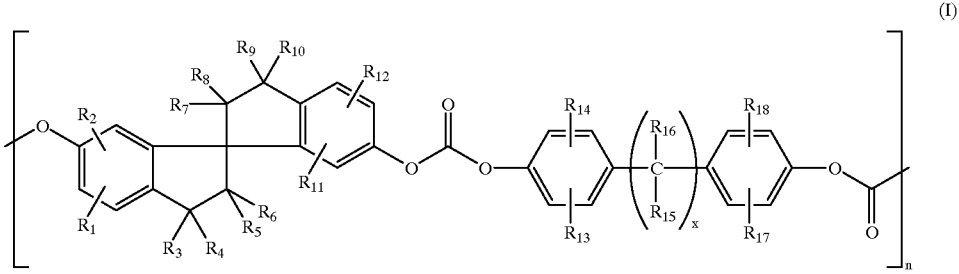

(I)

wherein n is an integer having a value from about 20 to 300, preferably at least about 40; $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ are each independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof; and x is 0 or 1. As used herein, alkyl refers to linear or branched hydrocarbon residues of 1 to 20 carbons. Similarly, cycloalkyl refers to cyclic hydrocarbon residues of 3 to 20 carbons. Alkenyl refers to linear or branched unsaturated hydrocarbons of 2 to 20 carbons having at least one double bond, and cycloalkenyl includes cyclic unsaturated hydrocarbons of 4 to 20 carbons having at least one double bond. Aryl refers to moieties having the six-carbon ring structure characteristic of benzene or the condensed six-carbon rings of other aromatic derivatives such as naphthalene, phenanthrene, anthracene, etc. For example, an aryl group may be phenyl or naphthyl and may be substituted or unsubstituted. Deuterated equivalents thereof, as used herein, refers to the hydrocarbon moieties listed above for $R_1$ to $R_{18}$ in which at least one hydrogen is replaced with the deuterium isotope. For example, a deuterated methyl group may be $CDH_2$, $CD_2H$, or $CD_3$, and a deuterated ethyl may be $CH_3CD_2$.

In another aspect, the indices of refraction for the present polycarbonate polymers differ by at least 0.3% from those corresponding to random SBI/BPA polycarbonates comprising momoners of 6,6'-dihydroxy-3,3,3',3'-tetramethyl-1,1'- carbonates exhibit good mechanical properties, good thermal stability, and good ductility at temperatures greater than 150° C. Surprisingly, the indices of refraction of the present alternating polymers differ sufficiently (>0.3%) at various wavelengths from those of random SBI/BPA copolycarbonates. Thus, polymeric optical fibers of the alternating copolymer are compatible with the random copolymer while maintaining the requisite difference in refractive index necessary for carrying an optical signal.

DESCRIPTION OF THE PREFERRED EMBODIMENTS

This invention relates to novel linear polycarbonates having the recurring structural unit (I) in which $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, n, and x are defined above.

More particularly, the linear polycarbonate polymers of the present invention contain units of structure (I), wherein a derivative of a spirobiindanol having the following subunit structure

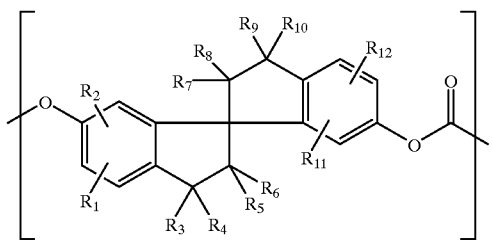

(II)

regularly alternates in the polymeric chain backbone with a derivative of a dihydroxyaromatic compound, ie. a bisphenol or biphenol, having the following subunit structure (III)

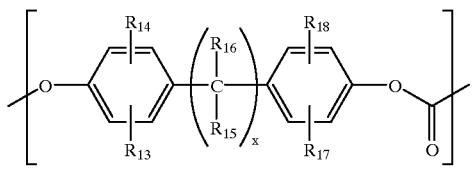

(III)

wherein $R_1$, $R_2$, $R_3$, $R_4$, $R_5$, $R_6$, $R_7$, R8, $R_9$, $R_{10}$, $R_{11}$, $R_{12}$, $R_{13}$, $R_{14}$, $R_{15}$, $R_{16}$, $R_{17}$, $R_{18}$, and x are previously defined. The combination of monomeric subunits (II) and (III) results in a linear polycarbonate copolymer (I), which may be referred to herein as an alternating, AB, alternating AB, or alternating (II):(III) polymer, copolymer, polycarbonate, or copolycarbonate.

Illustrative useful $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ substituents are hydrogen, alkyl such as methyl, ethyl, butyl, pentyl, octyl, nonyl, tert-butyl, neopentyl, isopropyl, sec-butyl, dodecyl, and the like; aryl such as phenyl; cycloalkyl such as cyclohexyl, cyclooctyl, cycloheptyl, cyclopentyl, and the like; alkoxyalkyl and aryloxyalkyl such as phenoxymethylene, phenoxyethylene, methoxymethylene, ethoxymethylene, methoxyethylene, butoxymethylene, propoxyethylene, and the like; arylalkyl such as phenylethyl, phenylpropyl, benzyl, and the like; and substituted alkyl and aryl groups such as cyanomethyl, chloromethyl, dichloromethyl, trichloromethyl, 3-chloropropyl, 3,4-dichlorophenyl, 4-chloro-3-cyanophenyl, fluoromethyl, difluoromethyl, trifluoromethyl, 4-nitrophenyl, phenoxyphenyl, 4-methylphenyl, 2,4-dimethylphenyl, 2-nitroethyl, nitromethyl, and the like. In addition, deuterated substituents $R_1$ to $R_{18}$ in which at least one hydrogen is replaced with the deuterium isotope may be employed. In many cases, the birefringence will be reduced by employing monomers in which at least one of $R_1$ to $R_{18}$ is other than hydrogen.

The dihydroxyaromatic subunits (III) may be derivatives of a biphenol compound, wherein x is 0. Alternatively, x is 1, and subunit (III) is a derivative of a bisphenol compound wherein a bridging carbon connects the phenol moieties.

Because of its ease in preparation and the commercial availability of BPA, a particularly preferred structural unit (I) comprises monomeric subunits (II) and (III) derived from SBI and BPA, wherein x is 1; $R_3$, $R_4$, $R_9$, $R_{10}$, $R_{15}$, and $R_{16}$ are methyl groups; and the remaining groups $R_1$, $R_2$, $R_5$–$R_8$, $R_{11}$–$R_{14}$, $R_{17}$, and $R_{18}$ are hydrogen. As previously defined, n ranges from about 20 to 300 but is preferably at least about 40. The resulting AB copolymer is shown by the following structural formula (IV):

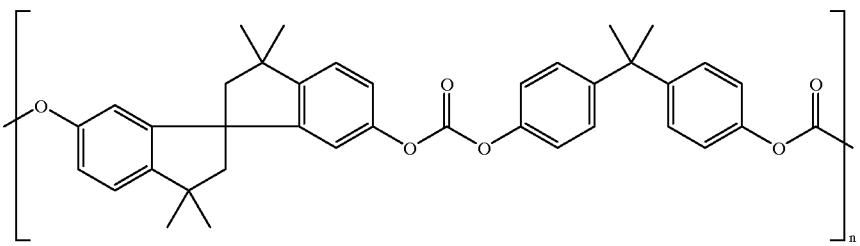

(IV)

Another preferred structural unit (I) comprises an SBI-based subunit of structure (II), wherein $R_3$, $R_4$, $R_9$, and $R_{10}$ are methyl groups, and $R_1$, $R_2$, $R_5$, $R_6$, $R_7$, R8, $R_{11}$, and $R_{12}$ are hydrogen, and a subunit (III) derived from a biphenol or a bisphenol other than BPA. For example, subunit structure (III) may be produced from hexachloro-BPA or hexafluoro-BPA. In another embodiment, subunit (III) is preferably a BPA moiety, wherein x is 1, $R_{15}$ and $R_{16}$ are methyl groups, and $R_{13}$, $R_{14}$, $R_{17}$, and $R_1$ are hydrogen, and subunit (II) is derived from a spirobiundanol other than SBI.

The weight average molecular weight ($M_w$, g/mole) of the alternating polycarbonate polymers of the present invention may vary widely. However, a high molecular weight, preferably >25,000 g/mole, is desirable to ensure that the integrity of the material is maintained when exposed to high temperatures (>150° C.). Typically, the weight average molecular weight of the present alternating polycarbonates ranges from about 45,000 g/mole to about 120,000 g/mole. These high molecular weight polycarbonate polymers are transparent, exhibit excellent film properties, remain ductile at high temperatures, and exhibit high glass transition temperatures ($T_g$) of at least 1510° C., but typically greater than 192° C. Thus, the present polymers are particularly useful in high temperature processing and optical applications.

The indices of refraction, as measured by thin film transmission spectroscopy, differ in the present alternating polymers from those of random SBI/BPA polycarbonates by at least 0.3%. Thus, the AB polycarbonates of the present invention may be used in combination with random SBI/BPA polycarbonates to form optical fibers and optical waveguides.

The dispersivity for the alternating spirobiindane/dihydroxyaromatic polycarbonates of the present invention ranges between about 1.6 and 2.2. Dispersivity, defined herein as $M_w/M_n$, provides a measurement of the distribution of chain lengths in a polymeric sample. A dispersivity of 1 indicates uniform chain length throughout the sample.

$M_n$ is the number average molecular weight of a polymer and is a function of the total number of molecules in a sample and the molecular weight of each molecule.

The AB copolymer composition of the present invention can be conveniently prepared by a conventional condensation polymerization reaction. In this reaction, nearly equimolar amounts of an appropriately substituted spirobiindanol of structure (V), wherein $R_1$ to $R_{12}$ are previously defined,

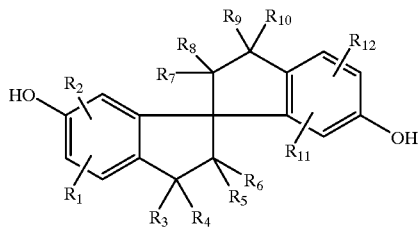

(V)

and an appropriately substituted aromatic bischloroformate compound of the formula (VI)

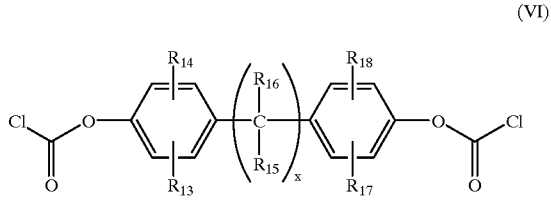

(VI)

wherein $R_{13}$ to $R_{18}$, and x are defined above, are combined. The molar amount of bischloroformate derivative (VI) slightly exceeds that of the spirobiindanol compound (V) in order to produce chloroformate end groups that are later capped with a monophenol. Initially, in this process, the spirobiindanol of formula (V) is combined in an inert atmosphere, such as in argon, with 4-N,N-dimethylaminopyridine (DMAP) in methylene chloride. The reaction mixture is heated, and a solution of the aromatic bischloroformate (VI) in methylene chloride is added over a period of up to three hours. During the addition, the reaction mixture is maintained at reflux at a temperature of about 50° C., then stirred for an additional hour. An excess of 4-cumylphenol is then added and the solution stirred for an additional hour.

The methylene chloride solution containing the AB copolymer may then be washed with a 1.0 M aqueous solution of hydrochloric acid, then water and brine. The resulting polymer solution, in $CH_2Cl_2$, can then be dried over $MgSO_4$, followed by concentration using a rotary evaporator. The polymer is isolated by pouring the solution dropwise into vigorously stirred absolute methanol. The alternating AB copolymer can then be collected by filtration followed by drying in vacuo.

Alternatively, the AB copolymer compositions of the present invention described above (alternating structures (II) and (III)) can be prepared by combining nearly equimolar amounts of an appropriately substituted spirobiindane bis-chloroformate compound represented by structure (VII)

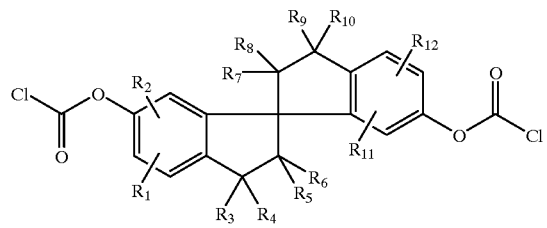

(VII)

wherein $R_1$ to $R_{12}$ are defined above, and an appropriately substituted biphenol or bisphenol of structure (VIII), wherein $R_{13}$ to $R_{18}$, and x are defined above.

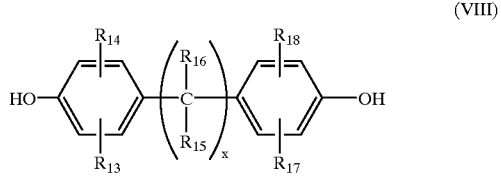

(VIII)

The reaction conditions are similar to those discussed above with respect to the reaction of structures (V) and (VI).

Methods for preparing spirobiindane bisphenols for use in the practice of this invention are disclosed in various references. For example, the compound of structure (V) can be conveniently prepared by reacting the appropriately substituted BPA with concentrated hydrochloric acid as described by Curtis in *J. Chem. Soc.*, 415–418 (1962), which is incorporated herein by reference. In addition, U.S. Pat. No. 2,979,534 and Steuben, *J. Poly Sci.*, Part A, 3, 3209–17 (1965) disclose the conversion of bisphenols, such as BPA, to the corresponding spirobiindanols and 1-(4-hydroxyphenyl)indanol using sulfuric acid, benzenesulfonic acid, or p-toluenesulfonic acid. The preparation of spirobiindanols using the aforementioned condensation reaction of BPA in the presence of sulfuric acid is also described in U.S. Pat. No. 3,271,463. U.S. Pat. No. 4,552,949 discloses the reaction in the presence of anhydrous methanesulfonic acid or hydrochloric acid, and U.S. Pat. No. 4,605,789 teaches the reaction in the presence of strong acid cation exchange resins.

Appropriately substituted bischloroformate structures (VI) and (VII) can be prepared from the corresponding spirobiindanol, biphenol, or bisphenol, methylene chloride, and phosgene by the method described for BPA by Brunelle et al. in *Polymer Int'l* 37, 179–186 (1995), which is also incorporated herein by reference.

The remaining reactants and reagents used in the above reactions are readily available materials. Such materials can be conveniently prepared in accordance with conventional preparatory procedures or obtained from commercial sources. Deuterated compounds for use in the preparation of deuterated polycarbonates may be prepared using deuterated reactants in the aforementioned reactions.

The invention is illustrated by the following examples but is not limited to the specific embodiments contained therein.

EXAMPLE 1

AB Copolycarbonate (-II:III-) Alternating Copolymer Derived from 6,6'-Dihydroxy-3,3,3',3'-tetramethyl-1,1'-spirobiindane (SBI)and 2,2-bis(4-hydroxyphenyl)propane (BPA); (-SBA:BPA-)

A solution of bisphenol A (34.25 g, 0.150 mol) and dimethylaminopyridine (37.02 g, 0.303 mol) in 750 ml methylene chloride was prepared in a three-neck flask equipped with a stirrer, a condenser and an addition funnel containing a solution of spirobiindane bis(chloroformate) (66.30 g, 0.153 mol) in 250 ml methylene chloride. The flask was purged with argon and an inert atmosphere was maintained throughout the reaction. Heat was applied and addition of the bischloroformate solution was begun. The bischloroformate solution was added over 2 hours while the solution was refluxing (~50° C.). One hour after addition of the monomer was complete, 4-cumylphenol (1.61 g, 7.6 mmol) was added. The solution was stirred at reflux for 1 hour longer. After 18 hours the methylene chloride solution was washed with aqueous 1.0 M HCl, water and brine, then dried over $MgSO_4$. The polymer solution was filtered and concentrated under vacuum to approximately 350 ml. Reprecipitation into 1 liter of methanol produced a granular white powder that was dried overnight in vacuo at 70° C., yield 73.7 g (83%). Molecular weight, thermal and film data are found in the Table below. Molecular weight was determined relative to polystyrene standards.

Alternatively, the same reaction is accomplished by addition of the bischloroformate of bisphenol A to a solution of SBI and DMAP in methylene chloride under the same conditions.

EXAMPLES 2–5

The procedure of Example 1 was repeated except that the rate of addition of bischloroformate was varied from 1 to 2 hours, and the concentration of the bischloroformate solution was varied between 0.20 M and 0.73 M.

THERMAL ANALYSES

Thermal analyses of the polycarbonate polymers of the present invention were performed with a Perkin Elmer Differential Scanning Calorimeter (DSC) 7 equipped with Pyris software. Preweighed samples were sealed in an aluminum pan that was placed in the furnace of the DSC. Each sample was heated from 50° C. to 250° C. at a rate of 10 degrees per minute. The furnace was then rapidly cooled to 50° C., and each sample was held at 50° C. for 15 minutes. The heating/cooling process was repeated for each sample under the same conditions a second time. The change in heat flow to the sample chamber was determined relative to a reference chamber that contained an empty aluminum pan. A graph of heat flow vs. temperature was prepared for each sample, and the $T_g$ value was calculated as the inflection point on the plotted curve for the second heating step.

INDEX OF REFRACTION MEASUREMENTS

The index of refraction for Example 1 was conventionally measured by thin film transmission spectroscopy at wavelengths from about 75 nm to about 1100 nm. Similarly, the refractive index was measured for various SBI/BPA polycarbonates having the following mole percentages of SBI to BPA: 50:50; 60:40; and 70:30. Transmission spectra for films having a thickness of 1–10 μm were obtained on a Perkin-Elmer Lambda 40 uv/vis Spectrophotometer. The spectra exhibited coherent multipass interference fringes. From the spacing of the fringes and independent measurement of the film thickness, the index of refraction as a function of wavelength was calculated for each sample.

The following Table summarizes the data obtained for the above Examples.

TABLE

Properties of Alternating (SBI:BPA) Polycarbonates

| | $M_w$ (g/mole) | $M_w/M_n$ | Yield (%) | $T_g$ (° C.) | Film |
|---|---|---|---|---|---|
| Example 1 | 48,400 | 1.9 | 83% | 195.0 | Ductile Clear |
| Example 2 | 64,200 | 2.0 | 83% | 192.4 | Ductile Clear |
| Example 3 | 64,600 | 1.9 | 84% | 193.0 | Ductile Clear |
| Example 4 | 101,100 | 1.6 | 74% | 194.0 | Ductile Clear |
| Example 5 | 117,000 | 1.6 | 67% | 198.7 | Ductile Clear |

As can be seen from the Table, the high molecular weight polycarbonate polymers of the present invention exhibit significantly higher glass transition temperature values than BPA polycarbonates having comparable molecular weights, i.e. 142.9° C. and 151.2° C. for commercial samples of LEXAN® OQ grade and 100 grade resins, respectively. In addition, the mechanical strength of these clear alternating copolymers is not sacrificed, and the materials remain ductile at high temperatures.

The AB polycarbonates of the present invention can therefore be used in high temperature processing applications where the aforementioned known BPA polymers cannot. In addition, the clear sprirobiindanol/dihydroxyaromatic polycarbonates of the present invention exhibit improved optical properties over known BPA polycarbonate compositions.

Due to the relative differences in refractive indices between the present alternating polymers and random SBI/BPA copolycarbonates, polymeric optical fibers can be formed using an AB copolymer of the present invention as core or cladding material in combination with the aforementioned random polymer as the corresponding cladding or core material.

While the invention has been particularly shown and described with reference to the preferred embodiments thereof, it will be understood by those skilled in the art that other changes in form and details may be made therein without departing from the spirit and scope of the invention.

We claim:

1. A linear alternating polycarbonate polymer comprising structural units of the formula

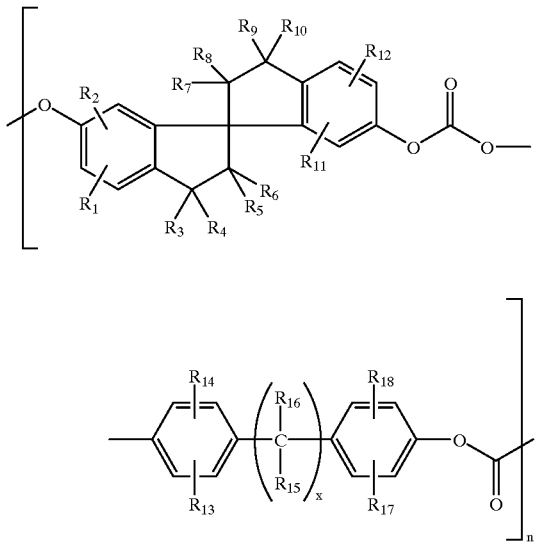

(I)

wherein n is an integer having a value from about 20 to 300; $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ are each independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof; and x is 0 or 1.

2. The polymer of claim 1, wherein $R_3$, $R_4$, $R_9$, and $R_{10}$ are methyl groups, and $R_1$, $R_2$, $R_5$, $R_6$, $R_7$, $R_8$, $R_{11}$, and $R_{12}$ are hydrogen.

3. The polymer of claim 1, wherein x is 0.

4. The polymer of claim 1, wherein x is 1.

5. The polymer of claim 4, wherein $R_{15}$, and $R_{16}$ are methyl groups, and $R_{13}$, $R_{14}$, $R_{17}$, and $R_{18}$ are hydrogen.

6. The polymer of claim 5, wherein $R_3$, $R_4$, $R_9$, and $R_{10}$ are methyl groups, and $R_1$, $R_2$, $R_5$, $R_6$, $R_7$, $R_8$, $R_{11}$, and $R_{12}$ are hydrogen.

7. The polymer of claim 6, wherein n is at least about 40.

8. The polymer of claim 1 having an index of refraction that differs by at least 0.3% from an index of refraction corresponding to a random polycarbonate comprising momoners of 6,6'-dihydroxy-3,3,3', 3'-tetramethyl-1,1'-spirobiindane randomly distributed with monomers of 2,2-bis(4-hydroxyphenyl) propane.

9. A linear polycarbonate polymer comprising alternating units of a spirobiindanol derivative and of a dihydroxyaromatic compound derivative, said polymer having a glass transition temperature value of at least 151° C.

10. The polymer of claim 9 having an index of refraction that differs by at least 0.3% from an index of refraction for a random polycarbonate comprising momoners of 6,6'-dihydroxy-3,3,3',3'-tetramethyl-1,1'-spirobiindane randomly distributed with monomers of 2,2-bis(4-hydroxyphenyl) propane.

* * * * *